US012574195B2

(12) United States Patent
Liao et al.

(10) Patent No.: US 12,574,195 B2
(45) Date of Patent: Mar. 10, 2026

(54) EFFICIENT BANDWIDTH ADAPTATION FOR A WIDEBAND CARRIER

(71) Applicant: MEDIATEK INC., Hsin-Chu (TW)

(72) Inventors: Pei-Kai Liao, Hsin-Chu (TW); Chia-Chun Hsu, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 299 days.

(21) Appl. No.: 18/495,051

(22) Filed: Oct. 26, 2023

(65) Prior Publication Data

US 2024/0056275 A1 Feb. 15, 2024

Related U.S. Application Data

(63) Continuation of application No. 17/719,109, filed on Apr. 12, 2022, now Pat. No. 11,843,564, which is a
(Continued)

(51) Int. Cl.
*H04L 5/00* (2006.01)
*H04W 72/1273* (2023.01)
(Continued)

(52) U.S. Cl.
CPC .......... *H04L 5/0098* (2013.01); *H04L 5/0007* (2013.01); *H04L 5/0042* (2013.01);
(Continued)

(58) Field of Classification Search
CPC ... H04L 5/0098; H04L 5/0007; H04L 5/0042; H04W 76/28; H04W 72/23; H04W 72/1273
See application file for complete search history.

(56) References Cited

U.S. PATENT DOCUMENTS

| | | | |
|---|---|---|---|
| 10,420,165 | B2 | 9/2019 | Dinan et al. |
| 10,492,157 | B2 | 11/2019 | Nam |

(Continued)

FOREIGN PATENT DOCUMENTS

| | | |
|---|---|---|
| CN | 105052230 A | 11/2015 |
| CN | 107078890 A | 8/2017 |
| CN | 107113722 A | 8/2017 |

OTHER PUBLICATIONS

International Search Report and Written Opinion of International Search Authority for PCT/CN2018/108609 dated Jan. 4, 2019 (9 pages).
(Continued)

*Primary Examiner* — Chandrahas B Patel
(74) *Attorney, Agent, or Firm* — Helen Mao; Imperium Patent Works

(57) ABSTRACT

Apparatus and methods are provided for efficient bandwidth adaptation for wideband carrier. In one novel aspect, the UE starts a BWP timer upon detecting one or more BWP timer starting triggering events, resets the BWP timer upon detecting BWP resetting triggering events, and switches to the default BWP upon expiration of the BWP timer. The BWP timer starting triggering events comprises decoding a command to switch away from the default BWP, the detection of end of DL data transmission in DRX mode. In another novel aspect, the UE only decodes the DCI indication for active BWP switching in the first three OFDM symbols of a subframe or a slot. In yet another novel aspect, when the SPS is configured for the serving cell for a UE with multiple BWPs, the SPS is configured for all the BWPs accordingly.

6 Claims, 7 Drawing Sheets

Related U.S. Application Data continuation of application No. 16/790,937, filed on Feb. 14, 2020, now Pat. No. 11,329,793, which is a continuation of application No. 16/145,704, filed on Sep. 28, 2018, now Pat. No. 10,594,468.

(60) Provisional application No. 62/586,977, filed on Nov. 16, 2017, provisional application No. 62/585,005, filed on Nov. 13, 2017, provisional application No. 62/565,191, filed on Sep. 29, 2017.

(51) Int. Cl.
    *H04W 72/23*      (2023.01)
    *H04W 76/28*      (2018.01)

(52) U.S. Cl.
    CPC ....... *H04W 72/1273* (2013.01); *H04W 72/23* (2023.01); *H04W 76/28* (2018.02); *H04L 5/001* (2013.01); *H04L 5/0044* (2013.01)

(56) References Cited

U.S. PATENT DOCUMENTS

| | | | |
|---|---|---|---|
| 10,945,252 | B2 | 3/2021 | Park |
| 11,006,303 | B2 | 5/2021 | Yum |
| 2014/0241319 | A1 | 8/2014 | Lee |
| 2019/0182884 | A1* | 6/2019 | Deenoo ................. H04L 1/0061 |

OTHER PUBLICATIONS

R1-1716258 3GPP TSG RAN WG1 Meeting AH_NR#3, InterDigital Inc., "Remaining details of BWP", Nagoya, Japan, Sep. 18-21, 2017 (6 pages) sections 1-3.

R1-1711289 3GPP TSG-RAN WG2#99bis Meeting, Samsung, "Impact of Bandwidth Parts on SPS Scheduling", Prague, Czech Republic, Oct. 9-13, 2017 (4 pages) sections 1-3.

R2-1709117 3GPP TSG RAN WG2 NR #99, Qualcomm Incorporated, "UE Power Saving during Active State", Berlin, Germany, Aug. 21-25, 2017 (6 pages) sections 1-4.

R1-1716883 3GPP TSG RAN WG1 Meeting NR#3, Qualcomm, "Offline discussion on GC-PDCCH for SFI", Nagoya, Japan, Sep. 18-21, 2017 (13 pages) discussion point 3.

China IP Office Search Report and Written Opinion for application 201880015501.3 dated Aug. 27, 2021 (9 pages) (no English translation available).

China Intellectual Property Office Action 202211407319.7 Dated Aug. 16, 2025 (No English Translation available).

3GPP TSG RAN WG1 Meeting AH_NR#3 R1-1716258; Sep. 21, 2017, InterDigital, Inc, Remaining details of BWP.

* cited by examiner

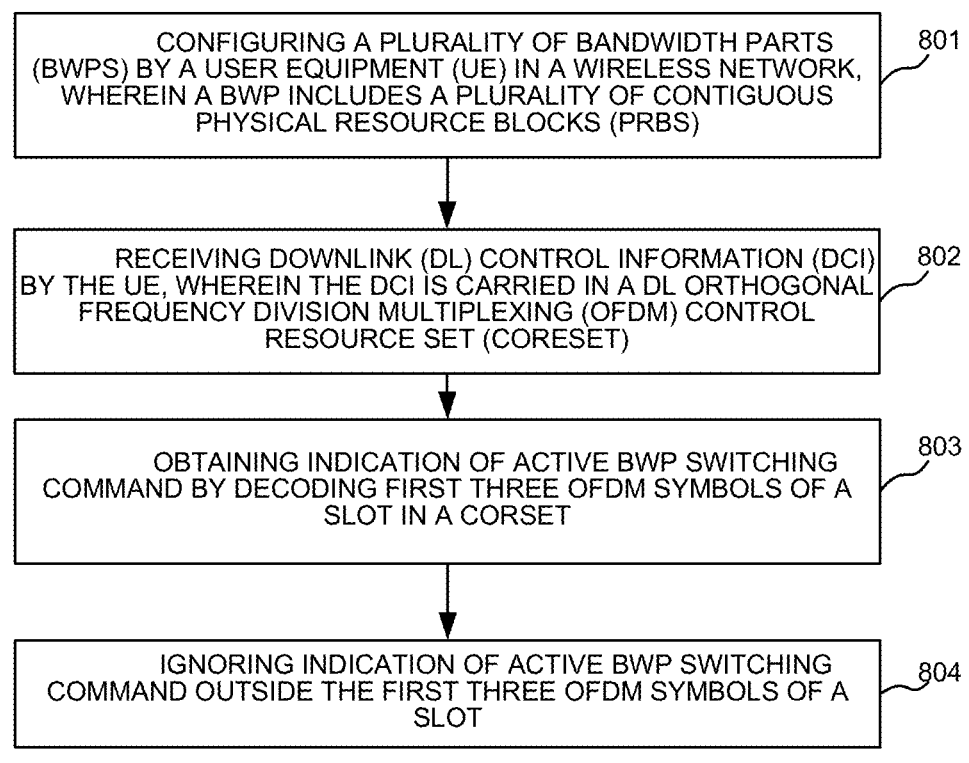

CONFIGURING A PLURALITY OF BANDWIDTH PARTS (BWPS) BY A USER EQUIPMENT (UE) IN A WIRELESS NETWORK, WHEREIN A BWP INCLUDES A PLURALITY OF CONTIGUOUS PHYSICAL RESOURCE BLOCKS (PRBS) — 801

RECEIVING DOWNLINK (DL) CONTROL INFORMATION (DCI) BY THE UE, WHEREIN THE DCI IS CARRIED IN A DL ORTHOGONAL FREQUENCY DIVISION MULTIPLEXING (OFDM) CONTROL RESOURCE SET (CORESET) — 802

OBTAINING INDICATION OF ACTIVE BWP SWITCHING COMMAND BY DECODING FIRST THREE OFDM SYMBOLS OF A SLOT IN A CORSET — 803

IGNORING INDICATION OF ACTIVE BWP SWITCHING COMMAND OUTSIDE THE FIRST THREE OFDM SYMBOLS OF A SLOT — 804

FIG. 8

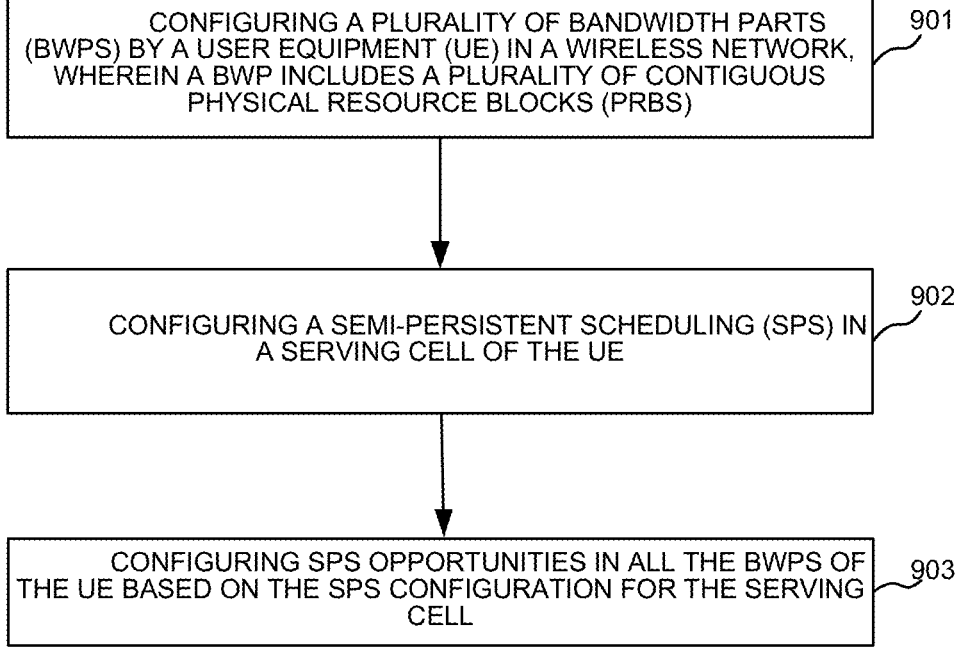

CONFIGURING A PLURALITY OF BANDWIDTH PARTS (BWPS) BY A USER EQUIPMENT (UE) IN A WIRELESS NETWORK, WHEREIN A BWP INCLUDES A PLURALITY OF CONTIGUOUS PHYSICAL RESOURCE BLOCKS (PRBS) — 901

CONFIGURING A SEMI-PERSISTENT SCHEDULING (SPS) IN A SERVING CELL OF THE UE — 902

CONFIGURING SPS OPPORTUNITIES IN ALL THE BWPS OF THE UE BASED ON THE SPS CONFIGURATION FOR THE SERVING CELL — 903

FIG. 9

EFFICIENT BANDWIDTH ADAPTATION FOR A WIDEBAND CARRIER

CROSS REFERENCE TO RELATED APPLICATIONS

This application is a continuation, and claims priority under 35 U.S.C. § 120 from nonprovisional U.S. patent application Ser. No. 17/719,109, entitled "EFFICIENT BANDWIDTH ADAPTATION FOR A WIDEBAND CAR-RIER," filed on Apr. 12, 2022, the subject matter of which is incorporated herein by reference. Application Ser. No. 17/719,109, in turn, is a continuation, and claims priority under 35 U.S.C. § 120 from nonprovisional U.S. patent application Ser. No. 16/790,937, entitled "EFFICIENT BANDWIDTH ADAPTATION FOR A WIDEBAND CAR-RIER," filed on Jun. 14, 2021, the subject matter of which is incorporated herein by reference. Application Ser. No. 16/790,937, in turn, is a continuation, and claims priority under 35 U.S.C. § 120 from nonprovisional U.S. patent application Ser. No. 16/145,704, entitled "EFFICIENT BANDWIDTH ADAPTATION FOR A WIDEBAND CAR-RIER", filed on Sep. 28, 2018, the subject matter of which is incorporated herein by reference. Application Ser. No. 16/145,704, in turn, claims priority under 35 U.S.C. § 119 U.S. provisional application 62/565,191, entitled "Methods of Power-efficient Bandwidth Adaptation in a Wideband Carrier" filed on Sep. 29, 2017, and application 62/585,005 entitled "Methods of Efficient Bandwidth Adaptation for a Wideband Carrier" filed on Nov. 13, 2017, and application 62/586,977 entitled "Efficient Bandwidth Adaptation Opera-tion in a Wideband Carrier" filed on Nov. 16, 2017, the subject matter of which is incorporated herein by reference.

TECHNICAL FIELD

The disclosed embodiments relate generally to wireless communication, and, more particularly, to methods and apparatus for efficient bandwidth adaptation for wideband carrier.

BACKGROUND

Mobile networks communication continues to grow rap-idly. The mobile data usage will continue skyrocketing. New data applications and services will require higher speed and more efficient. Large data bandwidth application continues to attract more consumers. New technologies are developed to meet the growth such as carrier aggregation (CA), which enables operators, vendors, content providers and the other mobile users to meet the increasing requirement for the data bandwidth. However, carrier aggregation assumes multiple RF chains for signal reception even for physically contigu-ous spectrum, which introduces long transition time to activate more carriers from one carrier for larger data bandwidth and decreases the efficiency of the data transmis-sion.

In frequency bands above 3 GHz, there could be a block of physically continuous spectrum up to hundreds of MHz. The single carrier operation for such large continuous spec-trum is more efficient in both the physical (PHY) control, with lower control signaling overhead, and PHY data, with higher trunking gains. It is, therefore, to configure the large contiguous spectrum for large data transmission instead of configuring multiple small spectrum resources. However, from the system level, not all the user equipment (UEs) require large channel bandwidth. Further, for each UE, not all applications require large channel bandwidth. Given that wideband operation requires higher power consumption, the use of the large spectrum resource for control signaling monitoring and low-data-rate services is not ideal for power saving and bandwidth efficiency.

A 5G base station/gNB would support enabling reduced UE bandwidth capability within a wideband carrier and enabling reduced UE power energy consumption by band-width adaptation. For UEs configured with multiple band-width parts (BWPs), the UE can switch BWP to enable faster data transmission or reduce power consumption or for other purposes. The issues remain in implementing the BWP management for UE efficiently.

Improvements and enhancements are required to facilitate 5G base station to support UEs operating with multiple BWPs to facilitate the power-efficient operation for wider bandwidth.

SUMMARY

Apparatus and methods are provided for efficient band-width adaptation for wideband carrier. In one novel aspect, timer-based active BWP switching are provided. The UE with multiple BWP configured starts a BWP timer upon detecting one or more BWP timer starting triggering events, resets the BWP timer upon detecting one or more BWP timer resetting triggering events, and switches to the default BWP upon expiration of the BWP timer. The UE sets an initial BWP or one of the configured BWPs as a default BWP based on a higher-layer configuration. In one embodiment, the BWP timer starting triggering event is successfully decoding a physical-layer signaling to switch away from the default BWP for a downlink (DL) to an active BWP other than the default BWP. In another embodiment, the BWP timer reset-ting triggering event is successfully decoding a downlink control information (DCI) to schedule one or more physical downlink shared channel (PDSCHs) in a BWP that is not the default BWP. In one embodiment, the UE is in a discon-tinuous reception (DRX) mode, and wherein a downlink (DL) active BWP during a DRX-on duration is set to be the default BWP for DL. In another embodiment, the UE is in the DRX mode and one of the configured DL BWP is set as the downlink (DL) active BWP during a DRX-on duration based on a higher-layer signaling. In one embodiment, the UE performs DCI monitoring on the default BWP for DL during the DRX-on duration. In one embodiment, the UE is in a discontinuous reception (DRX) mode, and wherein the UE switches to an active BWP different from the default BWP during the DRX-on duration upon receiving higher-layer signaling. The higher-layer signaling is RRC signaling, MAC CE or other form of signaling. In one embodiment, the UE is in a discontinuous reception (DRX) mode, and wherein BWP timer starting triggering event is successfully decoding a physical-layer signaling to switch away from the default BWP to an active BWP other than the default BWP. The UE starts the BWP timer upon detecting the physical-layer signaling to switch away from the default BWP to an active BWP other than the default BWP. In another embodi-ment, the UE is in a DRX mode, and wherein the BWP timer resetting triggering event is successfully decoding a DCI to schedule one or more physical downlink shared channel (PDSCHs) in a BWP that is not the default BWP for DL. In one embodiment, each BWP is configured with downlink (DL)/uplink (UL) pair, and wherein the BWP timer is restarted upon detecting a physical uplink shared channel (PUSCH) scheduled by a physical downlink common chan-nel (PDCCH) in a configured DL/UL BWP pair that is not the default BWP. In yet another embodiment, the BWP timer resetting triggering event is successfully decoding a DCI to schedule one or more physical uplink shared channel (PUSCHs) in a BWP.

In another novel aspect, the UE only decodes the DCI indication for active BWP switching in the first three OFDM symbols of a subframe or a slot. The DCI indication for active BWP switching outside the first three OFDM symbols of a subframe or a slot is ignored. The BWP switching command applies to UL BWP and the DL BWP. In one embodiment, the BWP switching command indicates to switch from a default BWP to an active BWP, and wherein the default BWP is configured by a higher-layer signaling.

In yet another novel aspect, when the SPS is configured for the serving cell for a UE with multiple BWPs, the SPS is configured for all the BWPs accordingly. In one embodiment, the serving SPS is configured with no downlink control information (DCI) activation, and wherein the configured SPS opportunities remain valid after the UE switches its active BWP. In one embodiment, when the SPS is configured with no DCI activation, only the SPS opportunities in the active BWP are activated after the BWP switching. In yet another embodiment, wherein the serving SPS is configured with downlink control information (DCI) activation, and wherein the configured SPS opportunities are released after the UE switches its active BWP. The switching of the UE's active BWP is triggered by at least one condition comprising: receiving a DCI scheduling command, and an expiration of a BWP timer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary flow chart for the active BWP switching being valid only within the first three OFMD symbols of a subframe or a slot in accordance with embodiments of the current invention.

FIG. 9 illustrates an exemplary flow chart for SPS configuration with active BWP switching in accordance with embodiments of the current invention.

DETAILED DESCRIPTION

Reference will now be made in detail to some embodiments of the invention, examples of which are illustrated in the accompanying drawings.

Figure 1:
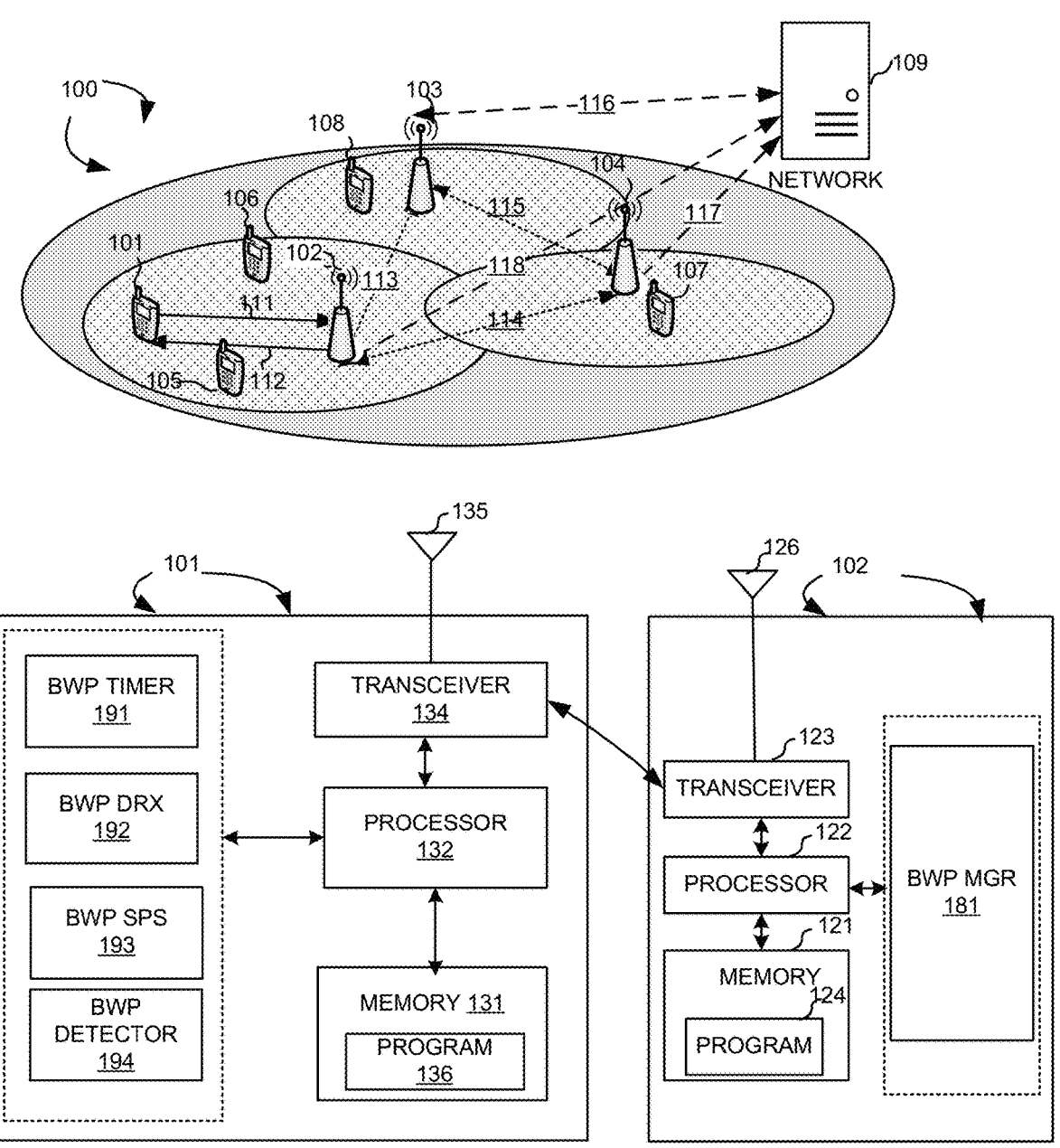
FIG. 1 illustrates a system diagram of a wireless network with one more BWPs configured in accordance with embodiments of the current invention.

FIG. 1 illustrates a system diagram of a wireless network 100 with one or more BWPs configured in accordance with embodiments of the current invention. Wireless communication system 100 includes one or more wireless networks each of the wireless communication network has fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, a gNB, or by other terminology used in the art. Each of the base unit 102, 103, and 104 serves a geographic area. Backhaul connections 113, 114 and 115 connect the non-co-located receiving base units, such as 102, 103, and 104. These backhaul connections can be either ideal or non-ideal A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103.

In one novel aspect, wireless communication network 100 operates with large contiguous radio spectrums. UE 101 while accessing wireless communication network 100, acquires synchronization information and system information using primary SS anchor. An SS block consists of synchronization signals and physical broadcast channel carries necessary system information for starting initial access procedure. UE RF bandwidth adaptation is supported. For more efficient operation of supporting the bandwidth adaptation, one or more bandwidth part (BWP) candidates with configuration parameters are configured per cell (or carrier). The BWP configuration parameters includes BWP numerology, such as subcarrier spacing and cyclic prefix (CP) length, the frequency location of the BWP and the BWP bandwidth. A BWP may include SS block. UE 101 may be configured with one or more BWPs per cell (or carrier). UE 101 is configured with at least one active DL/UL BWP at any given time. A DL BWP includes at least one control resource (CORESET) for the case of signal active DL/UL BWP at a given time. Each CORESET contains the time-frequency radio resource reserved to accommodate the schedulers for the DL/UL data. UE 101 can be configured with one or more CORESETs. A CORESET with a set of candidate locations for the schedulers of system information broadcast, DL broadcast or multi-cast data is a common search space (CSS) CORESET. A CORESET with a set of candidate locations for the schedulers of DL/UL unicast data is a UE-specific search space CORESET. Radio resource management (RRM) measurement is used for the network to manage the radio resources. RRM measurement includes at least reference signal received power (RSRP) and reference signal received quality (RSRQ).

The UE supports different BWP configurations. In one example, for paired spectrum, up to four UE-specific RRC configured DL BWPs and up to four UE-specific RRC configured UL BWPs per serving cell is supported. For unpaired spectrum, up to four UE-specific RRC configured DL/UL BWP pairs per serving cell is supported.

FIG. 1 further shows simplified block diagrams of wireless device/UE 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a wide band manager 181 that configures BWP, CORESET and communicates with UEs to implement the wide band operations.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. These functions can be implemented in software, firmware and hardware. A BWP timer unit/circuit 191 starts a dedicated BWP timer upon detecting one or more BWP timer starting triggering events and resets the BWP timer upon detecting one or more BWP resetting triggering events. A BWP discontinuous reception (DRX) unit/circuit 192 performs timer-based BWP switching in the DRX mode. A BWP SPS unit/circuit 193 configures SPS for UE with multiple BWPs and activates and releases the SPS upon BWP switching. A BWP detector 194 detects BWP management events including BWP timer triggers.

In one novel aspect, a timer-based active BWP switching is provided. A dedicated BWP timer is used independent of the DRX timer. The considerations of the DRX inactivity timer configuration and the timer configuration for the timer-based active BWP switching are very different. The DRX inactivity timer usually requires larger value to reduce the latency of potential DL data packet transmission. The timer for timer-based active BWP switching requires smaller value to maximize UE power saving. Enforcing the two different schemes to share the same timer may defeat their own design purpose and will complicate the designs. Further, from the UE perspective, the added complexity of one new timer is negligible.

Figure 2:
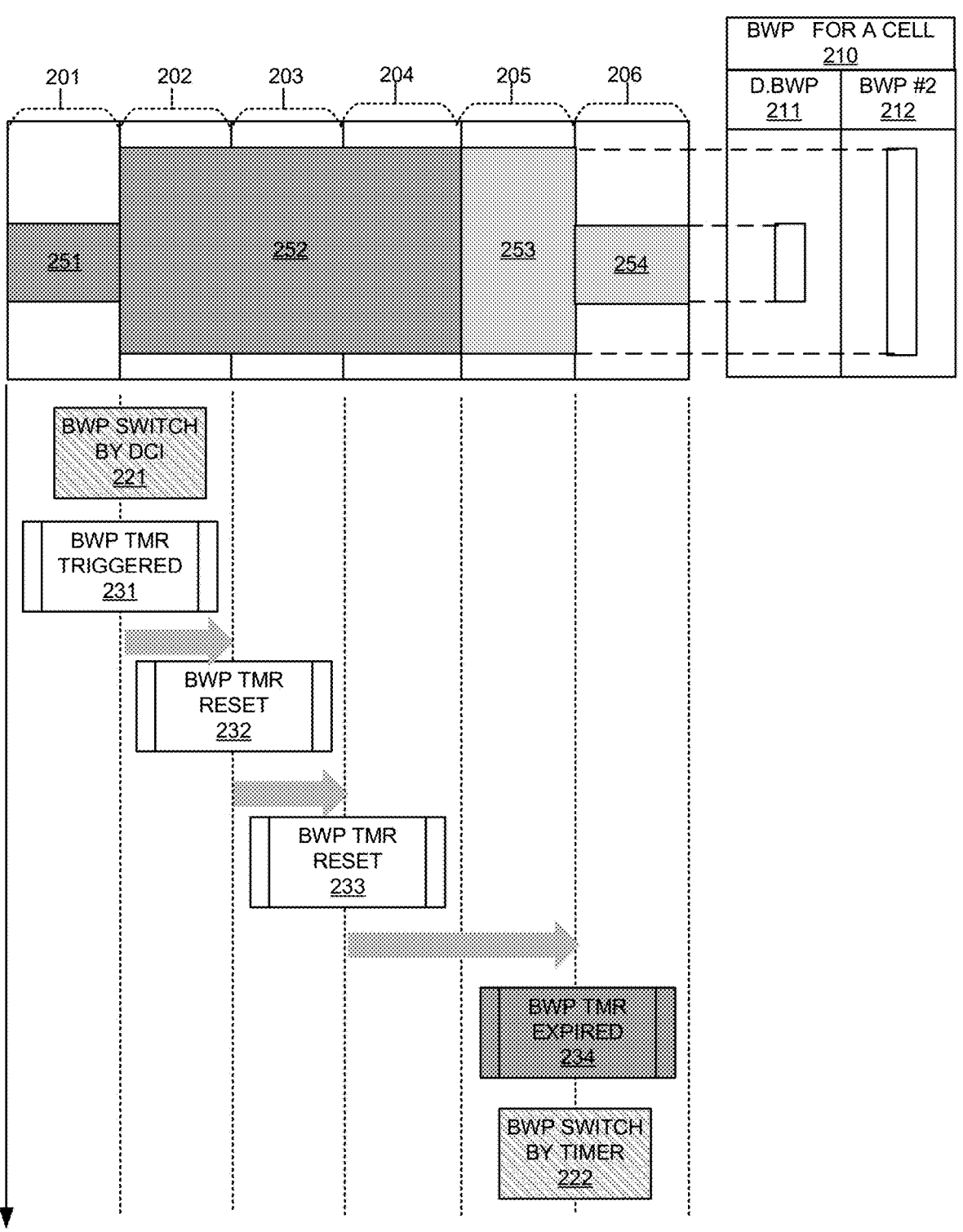
FIG. 2 illustrates exemplary diagrams of timer-based active BWP switching in accordance to embodiments of the current invention.

FIG. 2 illustrates exemplary diagrams of timer-based active BWP switching in accordance to embodiments of the current invention. In one embodiment, the BWP timer is triggered when the UE receives a DCI to switch its active DL BWP from the default BWP to another. In one embodiment, the UE sets an initial BWP as the default BWP. In another embodiment, the UE sets one of the configured BWPs as a default BWP. The setting of the default BWP is based on the higher-layer signaling. In one embodiment, the higher layer signaling is RRC signaling. In another embodiment, the higher layer signaling is MAC CE. The BWP timer is reset upon detecting the timer-resetting condition. In one embodiment, the timer-resetting condition is the UE receiving a DCI to schedule physical down link shared channels (PDSCHs) in the BWP other the default BWP. As illustrated, the UE is configured with multiple BWPs for a cell of the UE. BWP configuration 210 includes a default BWP 211 with a smaller bandwidth and a BWP #2 212 with larger bandwidth. Other similar BWP configurations are also possible for each cell of the UE. At any given time, at least one BWP is active. A default BWP is also configured for the UE. Time slots 201 to 206 is shown as exemplary continuous time slots for the UE. Default BWP 251 is active at slot 201. At step 221, a BWP switch command is received in the DCI. In one novel aspect, upon decoding the BWP switch command in the DCI, the UE starts a BWP timer at step 231. The UE switches to BWP #2 252 at time slot 202. Before the BWP timer expires, a BWP timer-resetting triggering event is detected and the UE reset the BWP timer at step 232. In one embodiment, the BWP timer-resetting triggering event is receiving a DCI to schedule PDSCH in the BWP other than the default BWP. The UE is scheduled to continue on BWP #2 at time slot 203. Similarly, the BWP timer is reset at step 233 upon detecting the DL PDSCH scheduling on BWP #2 for time slot 204. The UE stays on BWP #2 at time slot 204. At time slot 205, there is no more DL data transmission and the BWP timer continues. At the end of time slot 205, the BWP timer expired at step 234. In one embodiment, upon detecting the expiration of the BWP timer at step 234, the UE performs the timer-based BWP switching at step 222. The UE switches back to default BWP. The UE stays on the default BWP at time slot 206 with bandwidth of 254.

In other similar scenarios, the BWP timer serves to facilitate the BWP switches such that the UE configured with wideband carriers can be more efficient. Other BWP timer triggering events and timer-resetting triggering events can also be configured for the UE. In other embodiments, the UE operates in the DRX mode uses timer-based active BWP switching based on different triggering and resetting events.

Figure 3:
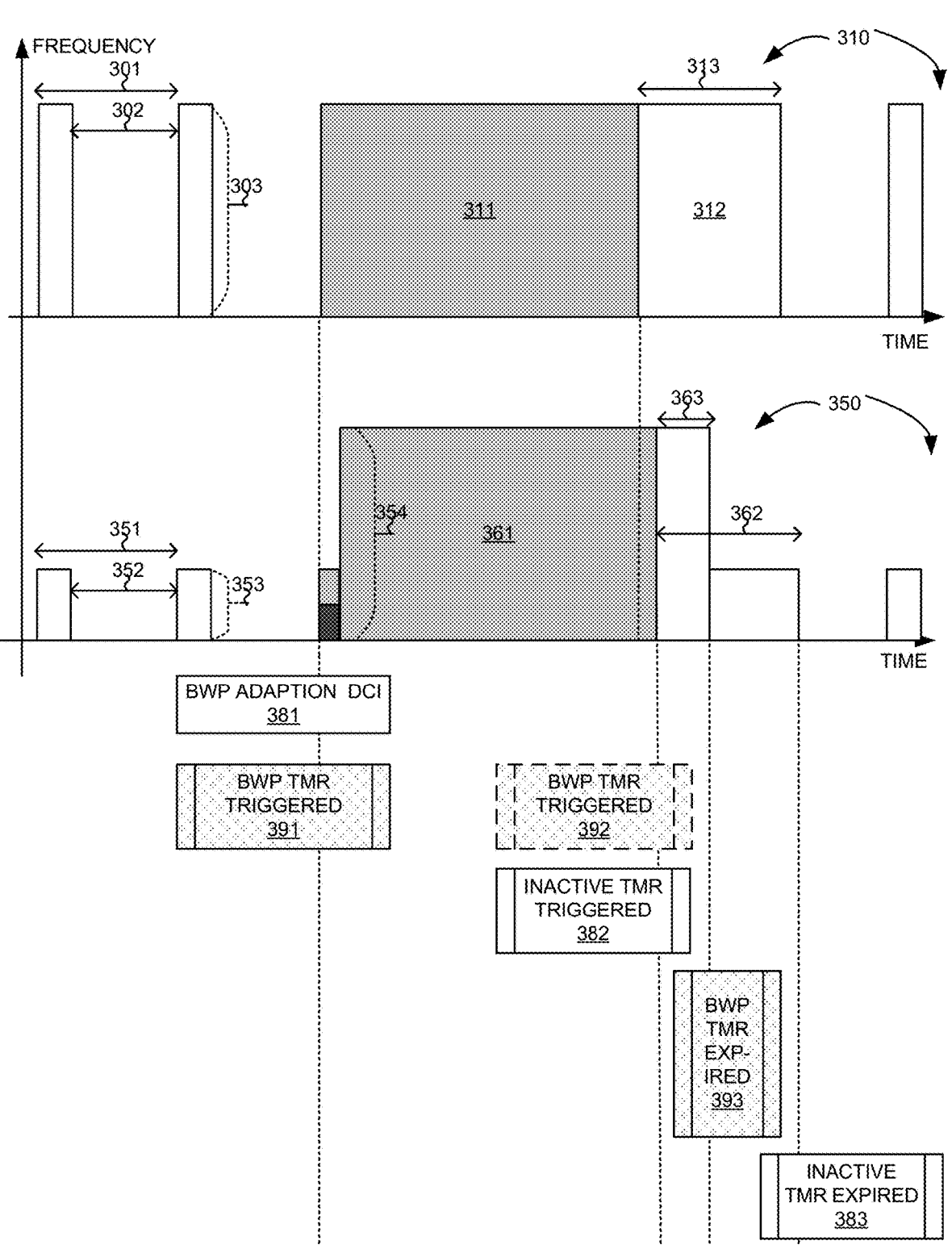
FIG. 3 illustrates exemplary diagrams for BWP operation with timer-based BWP switching in the DRX mode in accordance with embodiments of the current invention.

FIG. 3 illustrates exemplary diagrams for BWP operation with timer-based BWP switching in the DRX mode in accordance with embodiments of the current invention. For the UE without BWP configuration, the UE operates in the DRX mode 310 is configured with a DRX cycle 301, and a DRX-off period 302. In the DRX-on period, the UE operates with the bandwidth 303. At period 311, the UE detects DL data transfer during DRX-on period and the data transfer continues during period 311. At the end of period 311, the DL data transfer ended. The UE is configured with an inactivity timer with a timer value 313. During the period of 312, there is no DL data but the UE stays with the bandwidth 303 and monitors the PDCCH. At the end of the inactivity timer 313, the UE enters DRX-off period again.

For UE configured with multiple BWPs, the DRX operation 350 is different. For better power saving gain, the UE assumes the default DL BWP as the active DL BWP by default for DCI monitoring during DRX-on duration. However, it is also beneficial to allow the network to switch a UE's active DL BWP from the default DL BWP to the one with wider bandwidth to shorten the time for DL data reception when there is DL data scheduling. For active UL BWP indication/switching, it can be indicated by UL scheduling DCI. It is also beneficial to support the timer-based active DL BWP switching to allow faster switching back to the default BWP when there is no data scheduling. The DCI-based DL/UL BWP switching and the timer-based DL/UL BWP switching are supported with the DRX mode.

The UE, with multiple BWP operating with DRX, is configured multiple BWPs with a default BWP. The UE also configured with DRX cycle 351 and the DRX-off period 352. When there is no data transmission, in one embodiment, the UE operates in the default BWP with a bandwidth 353. During the DRX-on period, the UE receives BWP adaptation command from a higher-layer signaling at step 381. In one embodiment, the BWP adaptation command is received in the DCI. In another embodiment, the BWP adaptation command is received through the radio resource control (RRC) signaling. Optionally, in one embodiment, the UE starts the BWP timer at step 391, upon decoding the higher-layer signaling for the BWP adaptation. The UE switches its active BWP to BWP 361 with a bandwidth 354. In one novel aspect, a separate BWP timer is used together with the DRX timers. During the data transmission, the UE may reset its BWP timer started at step 391. Upon finishing the data transfer, the UE starts the inactivity timer at step 382.

In another embodiment, instead of triggering the BWP timer at step 391 upon detecting the BWP switching command, the BWP timer is started when the data transfer finished at step 392. The BWP timer started at step 392 has a timer value 363, which is smaller than the inactivity timer value 362. Upon expiration of the BWP timer, the UE performs the timer-based active BWP switching and switches its active BWP back to the default BWP at step 393. At step 383, the inactivity timer expired and the UE returns to DRX-off period.

In the first embodiment, in the DRX mode, a UE assumes that the default DL BWP is the active DL BWP by default during DRX-on duration if there is no higher-layer configuration supported or signaled from the network to the UE. In second embodiment, in DRX mode, the network signals to a UE by higher-layer signaling, indicating which DL BWP is the active DL BWP by default during DRX-on duration. In one embodiment, the higher-layer signaling is the RRC signaling. In another embodiment, the higher-layer signaling is MAC CE. In third embodiment, in DRX mode, a UE switches its active DL BWP from one to another when it receives a physical-layer signaling for active DL BWP switching during DRX-on duration. In the fourth embodiment, in DRX mode, a UE switches its active UL BWP from one to another when it receives a physical-layer signaling for active UL BWP switching during DRX-on duration. In the fifth embodiment, in DRX mode, a UE switches its active DL BWP from a DL BWP to the default DL BWP when the timer for timer-based active DL BWP switching expires.

For unpaired spectrum, such the TDD, due to the linking between the configured DL BWP and the UL BWP, there may be active DL/UL BWP pair indication conflict between the scheduling DCI based and timer-based BWP switching. The linked DL BWP and UL BWP allows the UE to switch from Rx to Tx and vice versa without changing its RF center frequency for short switching time that requires increasing RF hardware cost. Therefore, it is important to resolve the conflict for the paired DL/UL BWP configuration.

Figure 4:
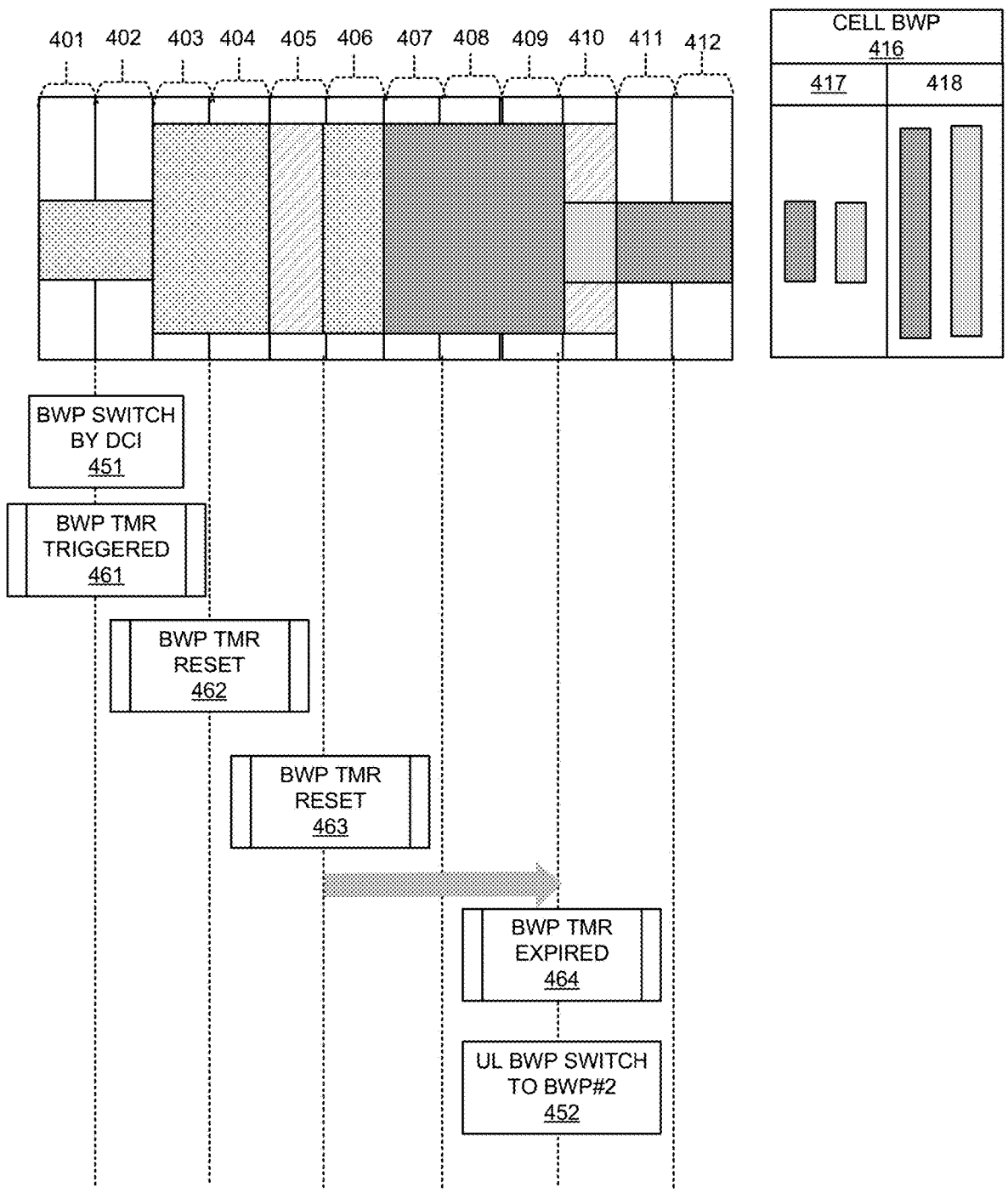
FIG. 4 illustrates exemplary diagrams for paired DL/UL BWP with timer-based active BWP switching in accordance with embodiments of the current invention.

FIG. 4 illustrates exemplary diagrams for paired DL/UL BWP with timer-based active BWP switching in accordance with embodiments of the current invention. The UE is configured with multiple BWPs with DL/UL BWP pair. The exemplary cell BWP configuration 416 includes a default DL/UL BWP pair 417 and a DL/UL BWP #2 pair 418. As illustrated, the UE operates at the DL/UL default BWP pair in time slots 401 and 402. At the beginning of time slot 402, the UE receives BWP switching command in the DCI at step 451. In one embodiment, the UE starts the BWP timer, at step 461 upon detecting the triggering event of the BWP switching command. The UE receives DL data transmission with the BWP #2 at time slots 403 and 404. At step 462, the UE resets the BWP timer because it receives the DL scheduling. At time slot 405, the UE transmits UL data with UL BWP #2. At time 406, the UE receives DL scheduling for DL data to be received on DL BWP #2. Upon receiving the DL scheduling, the UE reset the BWP timer at step 463. At time slot 407, 408 and 409, the UE stays on BWP #2 while there is no DL or UL data. The BWP timer elapsed and at step 464, the BWP timer expired. Accordingly, the UE would have switch back to the default BWP for both the DL and UL BWP since the DL and UL are linked BWP pair. A conflict would occur when at time slot 410, the UE needs to send uplink data and is scheduled to use BWP #2 for the UL. If the UE follows the higher-layer signaling switching the UL to BWP #2 while the DL BWP switched back to the default BWP based on the timer-based active BWP switching, the DL and UL have a conflict. In one embodiment, the UE restarts the timer when it detects PDCCH to schedule PDSCH in the DL/UL BWP pair other than the default DL/UL BWP pair. The UE adds one timer-resetting condition as detecting PDCCH to schedule PUSCH in the DL/UL BWP pair other than the default DL/UL BWP pair. In another embodiment, the UE restarts the timer when it successfully decoding a DCI to schedule one or more PDSCHs in a BWP that is not the default BWP for DL. The UE adds one timer-resetting condition as successfully decoding a DCI to schedule one or more PDSCHs in a BWP that is not the default BWP for DL. In another embodiment, the UE follows the indication of scheduling DCI based active DL/UL BWP pair switching when there is a conflict between the indication of timer-based active DL/UL BWP pair switching and the indication of scheduling DCI based active DL/UL BWP pair switching. In another embodiment, the UE restarts the timer when it successfully decoding a DCI to schedule one or more PUSCHs in a BWP. The UE adds one timer-resetting condition as successfully decoding a DCI to schedule one or more PUSCHs in a BWP.

In another embodiment, the UE only decodes the scheduling DCI carrying an indication of active DL or UL BWP switching in a CORESET within the first 3 orthogonal frequency division multiplexing (OFDM) symbols of a subframe or a slot. The BWP switching information outside the first 3 OFDM symbols of a subframe or a slot is ignored.

Figure 5:
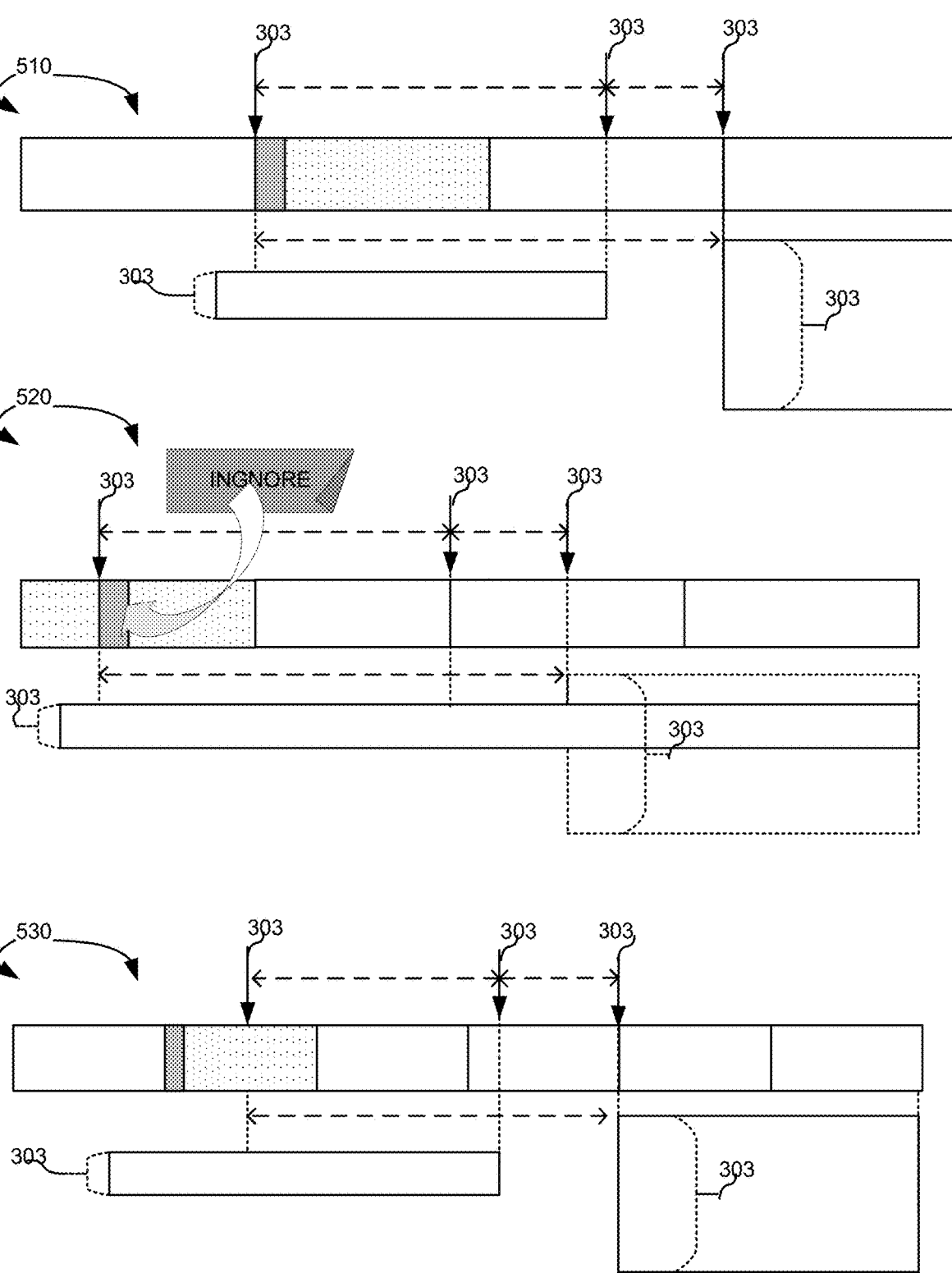
FIG. 5 illustrates exemplary diagrams for the active BWP switching decoding scheme with OFDM symbols in accordance with embodiments of the current invention.

FIG. 5 illustrates exemplary diagrams for the active BWP switching decoding scheme with OFDM symbols in accordance with embodiments of the current invention. The UE is not expected to receive the scheduling DCI carrying an indication of active DL (or UL) BWP switching in a CORESET outside first 3 OFDM symbols of a subframe or a slot. Three exemplary scenarios are shown. Scenario 510 illustrates an 15 Khz subcarrier space (SCS) with the DCI carrying the indication of active BWP switching in the first three OFDM symbols of a subframe or a slot. Scenario 520 illustrates an 15 Khz SCS with the DCI carrying the indication of active BWP switching outside the first three OFDM symbols of a subframe or a slot and the DCI command is ignored. Scenario 530 illustrates an 30 Khz SCS with the DCI carrying the indication of active BWP switching in the first three OFDM symbols of a subframe or a slot.

The UE is configured with a default BWP #1 with bandwidth 501 and a BWP #2 with bandwidth 502. Scenario 510 shows four time slots. The SCS is 15 khz. At the beginning of the second time slot at step 511, the UE receives active BWP switching DCI at the default BWP #1 to switch to BWP #2. After time 503 of processing time for the DCI command, at step 512, the UE starts to perform RF tuning and AGC settling for BWP #2 with time 504. At step 513, the UE starts to receiving data on PDCCH or PDSCH. From step 511 to 513, length 519 there are 28 OFDM symbols. The UE starts the new BWP #2 at the start of the subframe or the slot. In this scenario, the UE monitors the first three OFDM symbols for the DCI indication of active BWP switching and upon successfully obtaining the command, the UE switches its BWP accordingly.

In scenario 520, the UE ignores any DCI indication for active BWP switching outside the first three symbols of a subframe or a slot. At step 521, assuming there is a DCI indication received on BWP #1 for active BWP switching command to BWP #2, the UE would ignore this command. As an example, if the UE performs the command accordingly, the UE needs time 503 to prepare and at step 522 the UE performs the RF tuning and AGC settling. Upon finishing the RF tuning, the UE at step 523 would start to receive data on BWP #2. However, the starting of the BWP #2 does not fall at the beginning of a subframe or a slot. From step 521 to 523, length 529 there are 28 OFDM symbols. Instead, the BWP #2 starts at the middle of a subframe or a slot. Therefore, to avoid the problem, the DCI indication for active BWP switching outside the first three symbols are ignored. The UE continues to operate on BWP #1.

Scenario 530 illustrates a similar success active BWP switching for a 30 Khz SCS whose DCI indication for active BWP switching is within the first three symbol of a subframe or a slot. At step 531, the UE receives active BWP switching DCI at the default BWP #1 to switch to BWP #2. After time 503 of processing time for the DCI command, at step 532, the UE starts to perform RF tuning and AGC settling for BWP #2 with time 504. At step 533, the UE starts to receiving data on PDCCH or PDSCH. From step 531 to 533, length 539 there are 56 OFDM symbols. The UE starts the new BWP #2 at the start of the subframe or the slot. In this scenario, the UE monitors the first three OFDM symbols for the DCI indication of active BWP switching and upon successfully obtaining the command, the UE switches its BWP accordingly.

In another novel aspect, when a semi-persistent scheduling (SPS) is configured for a serving cell, each configured DL/UL BWP also includes SPS configuration.

Figure 6:
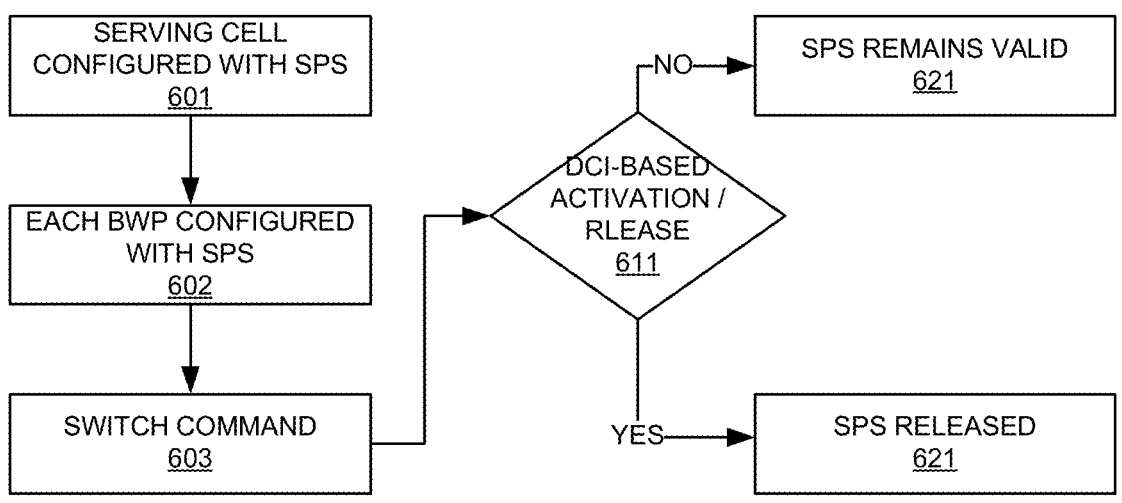
FIG. 6 illustrates an exemplary diagram for SPS configuration with multiple BWP in accordance with embodiments of the current invention.

FIG. 6 illustrates an exemplary diagram for SPS configuration with multiple BWP in accordance with embodiments of the current invention. Since SPS is mainly meant for smaller data packet, the configured or activated SPS opportunities (either DL or UL) should be able to be accommodated in all configured (either DL or UL) BWPs. For SPS with no DCI-based activation/release, the configured SPS opportunities should remain valid after a UE switches its active DL (UL) BWP from one to another by either scheduling DCI-based or timer-based scheme. In one embodiment, only the SPS opportunities in its active DL (UL) BWP are activated to the UE. For SPS with DCI-based activation/release, the activated SPS opportunities should be assumed to be released by default after a UE switches its active DL (UL) BWP from one to another by either scheduling DCI-based or timer-based scheme. At step 601, the serving cell of the UE is configured with SPS. At step 602, each BWP configured is also configured with SPS accordingly. At step 603, the UE receives BWP switching command. At step 611, the UE determines if the BWP switching command is DCI-based BWP activation or release. If step 611 determines no, the UE moves to step 621, the configured SPS remains valid by either scheduling DCI-based or timer-based. In one embodiment, only the SPS opportunities in its active DL (UL) BWP are activated to the UE. If step 611 determines yes, the configured SPS is released.

Figure 7:
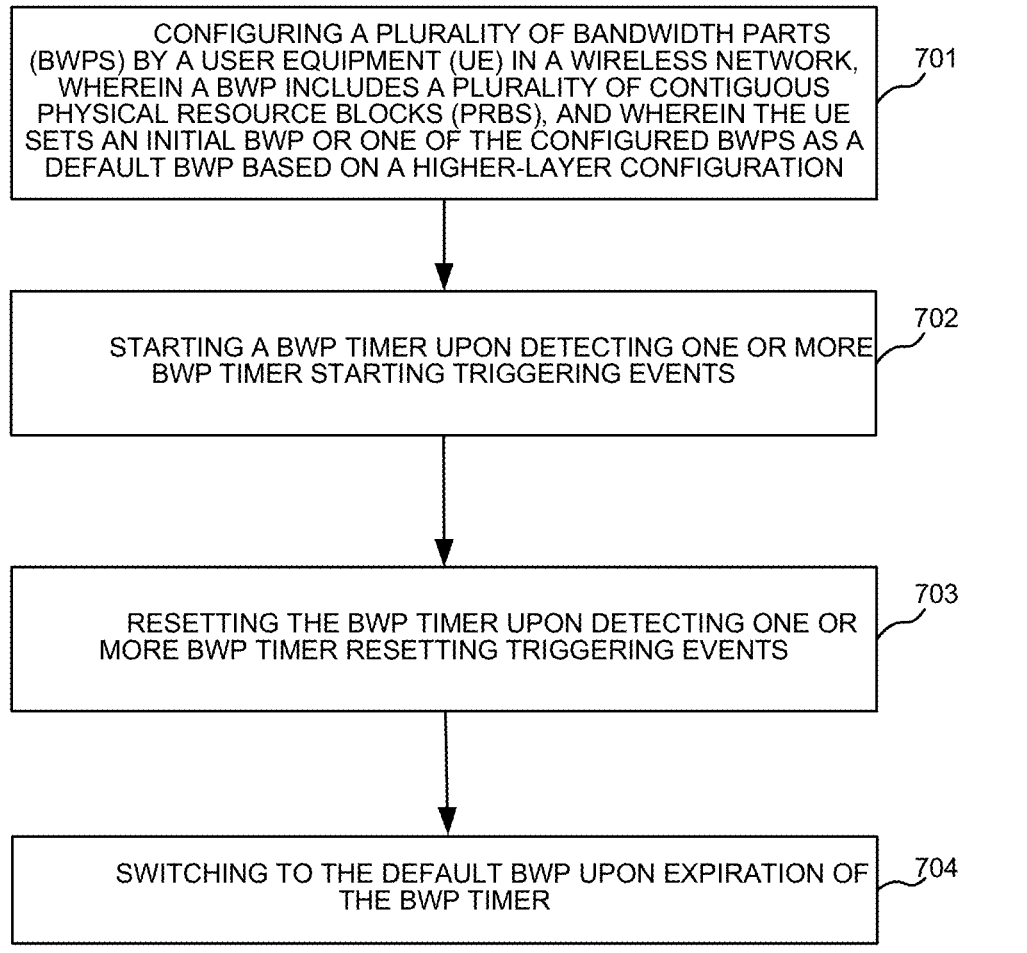
FIG. 7 illustrates an exemplary flow chart for the time-based active BWP switching in accordance with embodiments of the current invention.

FIG. 7 illustrates an exemplary flow chart for the time-based active BWP switching in accordance with embodiments of the current invention. At step 701, the UE configures a plurality of BWPs in a wireless network, wherein a BWP includes a plurality of contiguous PRBs, and wherein the UE sets an initial BWP or one of the configured BWPs as a default BWP based on a higher-layer configuration. At step 702, the UE starts a BWP timer upon detecting one or more BWP timer starting triggering events. At step 703, the UE resets the BWP timer upon detecting one or more BWP timer resetting triggering events. At step 704, the UE switches to the default BWP upon expiration of the BWP timer.

FIG. 8 illustrates an exemplary flow chart for the active BWP switching being valid only within the first three OFMD symbols of a subframe or a slot in accordance with embodiments of the current invention. At step 801, the UE configuring a plurality of BWPs in a wireless network, wherein a BWP includes a plurality of contiguous PRBs. At step 802, the UE receives DL DCI, wherein the DCI is carried in a DL OFDM CORESET. At step 803, the UE obtains indication of active BWP switching command by decoding first three OFDM symbols of a slot in a CORSET. At step 804, the UE ignores indication of active BWP switching command outside the first three OFDM symbols of a slot.

FIG. 9 illustrates an exemplary flow chart for SPS configuration with active BWP switching in accordance with embodiments of the current invention. At step 901, the UE configures a plurality of BWPs in a wireless network, wherein a BWP includes a plurality of contiguous PRBs. At step 902, the UE configures a SPS in a serving cell of the UE. At step 903, the UE configures SPS opportunities in all the BWPs of the UE based on the SPS configuration for the serving cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

receiving a first higher-layer signaling from a base station, wherein the first higher-layer signaling includes a plurality of DL bandwidth part (BWP) configurations and wherein a DL BWP includes a plurality of contiguous physical resource blocks (PRBs);

receiving a second higher-layer signaling from a base station, wherein the second higher-layer signaling includes the configurations related to timer-based DL active BWP switch;

setting an initial DL BWP as a default DL BWP if a default DL BWP configuration is not provided in the second higher-layer signaling;

setting one of the configured DL BWPs as a default DL BWP if a default DL BWP configuration is provided in the second higher-layer signaling;

starting a BWP timer based on the second higher-layer signaling upon detecting one or more BWP timer starting triggering events;

resetting the BWP timer upon detecting one or more BWP timer resetting triggering events; and

switching to the default BWP upon expiration of the BWP timer.

2. The method of claim 1, wherein the DL BWP switch involves switching from a default BWP to an active BWP.

3. The method of claim 2, wherein the default BWP is configured by a higher-layer signal.

4. A user equipment (UE), comprising:

a frequency (RF) transceiver that transmits and receives radio signals in a wireless network;

a memory; and a processor coupled to the memory, the processor configured to:

receive a first higher-layer signaling from a base station, wherein the first higher-layer signaling includes a plurality of DL bandwidth part (BWP) configurations and wherein a DL BWP includes a plurality of contiguous physical resource blocks (PRBs);

receive a second higher-layer signaling from a base station, wherein the second higher-layer signaling includes the configurations related to timer-based DL active BWP switch;

set an initial DL BWP as a default DL BWP if a default DL BWP configuration is not provided in the second higher-layer signaling;

set one of the configured DL BWPs as a default DL BWP if a default DL BWP configuration is provided in the second higher-layer signaling;

start a BWP timer based on the second higher-layer signaling upon detecting one or more BWP timer starting triggering events;

reset the BWP timer upon detecting one or more BWP timer resetting triggering events; and switch to the default BWP upon expiration of the BWP timer.

5. The UE of claim 4, wherein the DL BWP switch involves switching from a default BWP to an active BWP.

6. The UE of claim 5, wherein the default BWP is configured by a higher-layer signal.

* * * * *